Jan. 17, 1967      J. N. STACY      3,298,139
BUFFING MACHINE
Filed March 2, 1964      7 Sheets-Sheet 1
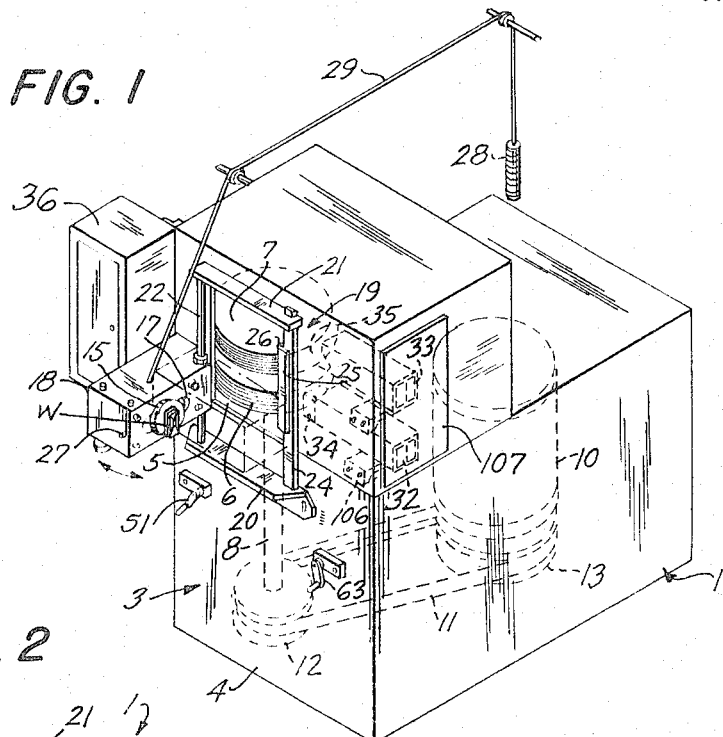
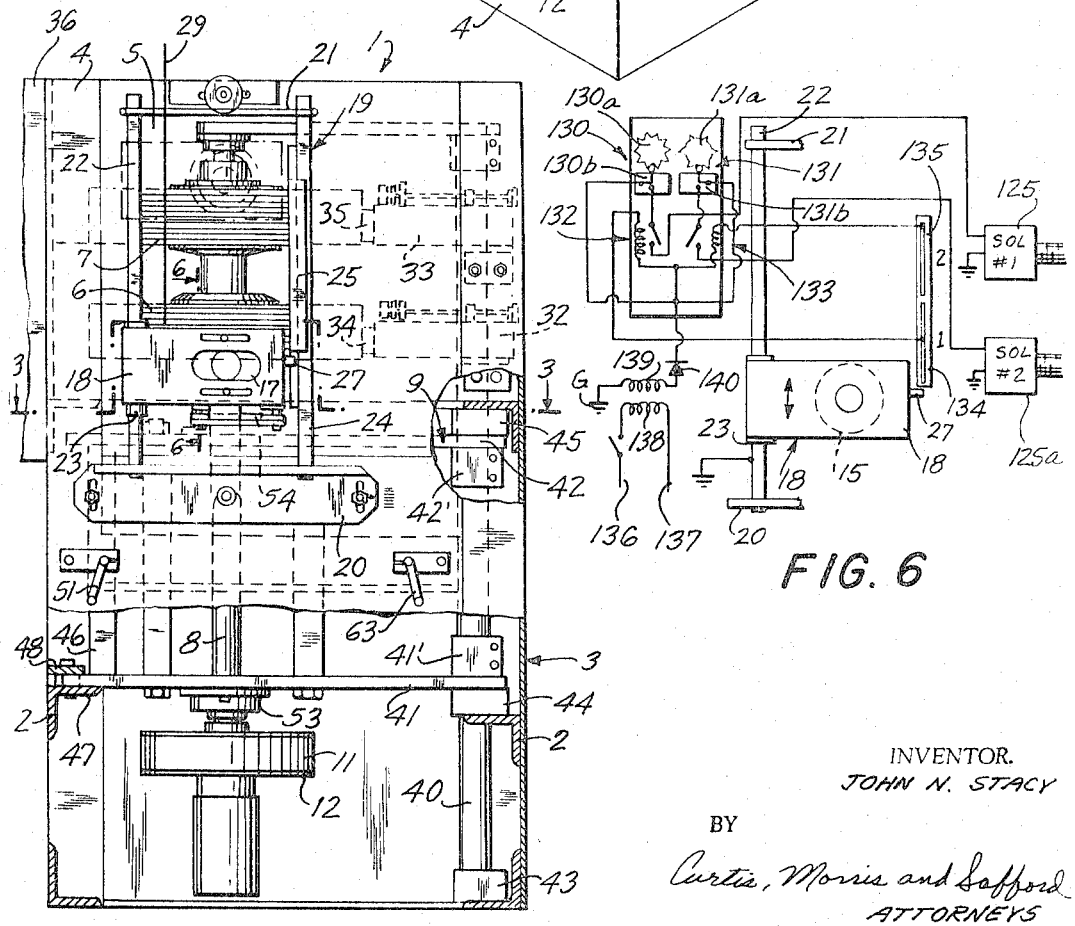
INVENTOR.
JOHN N. STACY
BY
Curtis, Morris and Safford
ATTORNEYS Jan. 17, 1967   J. N. STACY   3,298,139
BUFFING MACHINE
Filed March 2, 1964   7 Sheets-Sheet 2

INVENTOR.
JOHN N. STACY
BY
Curtis, Morris and Safford
ATTORNEYS

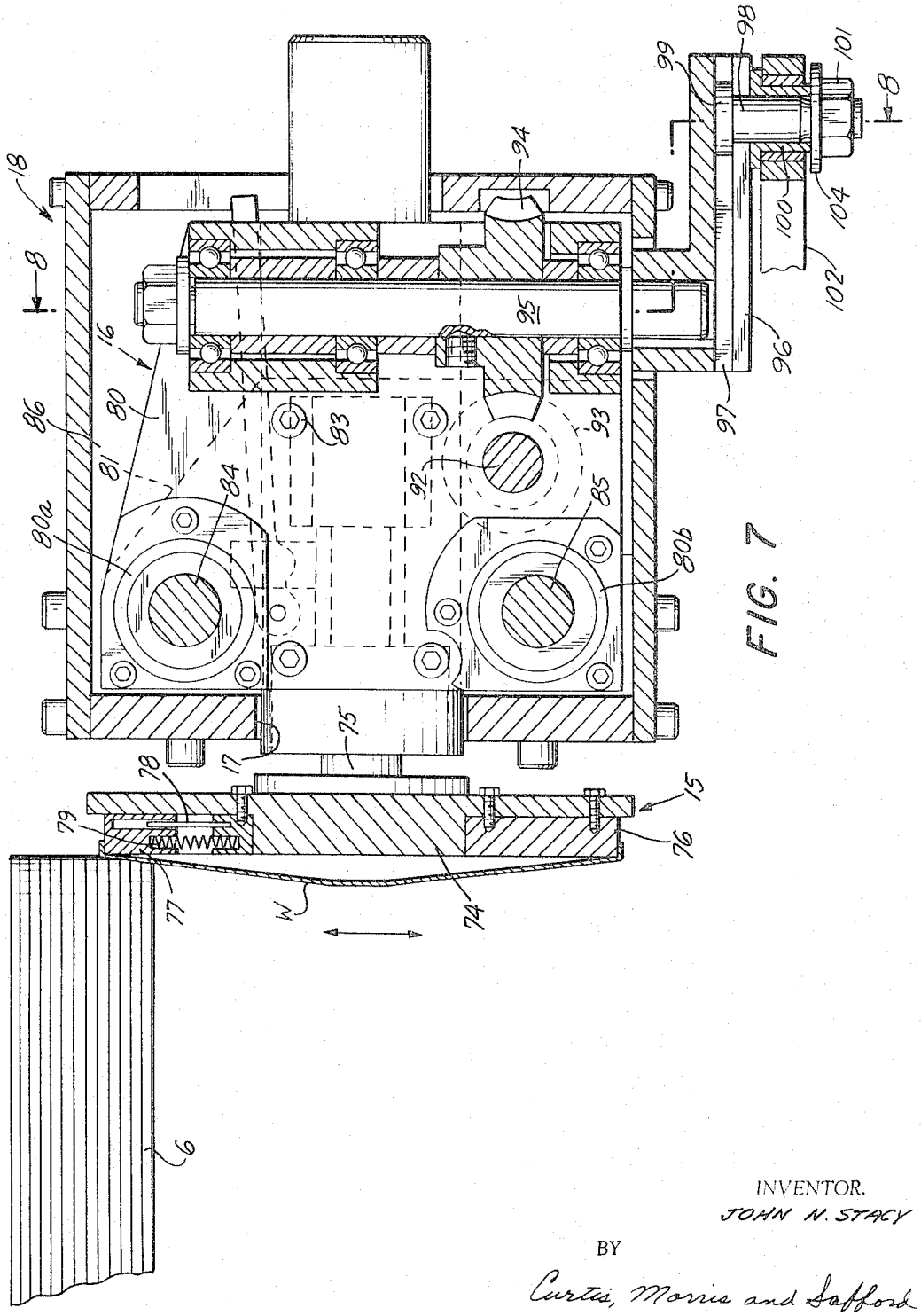

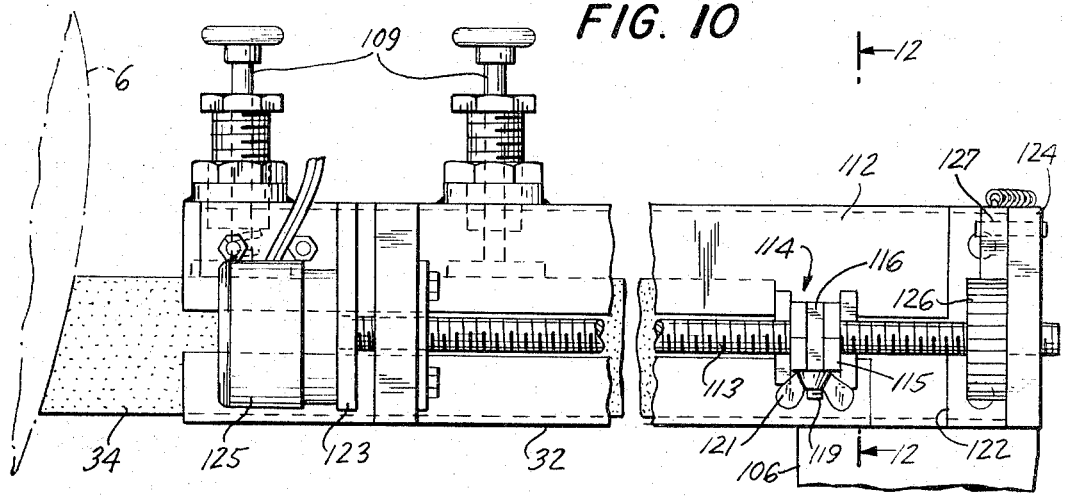
FIG. 10
FIG. 11
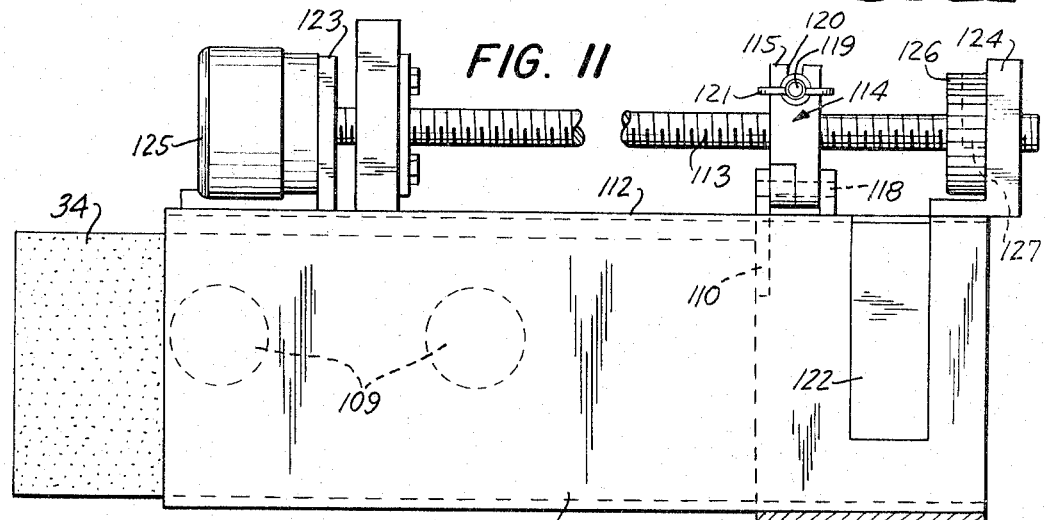
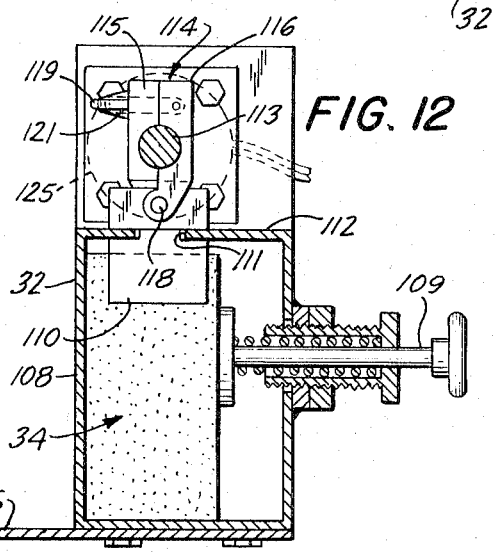
FIG. 12
FIG. 13
INVENTOR.
JOHN N. STACY
BY
Curtis, Morris and Safford
ATTORNEYS Jan. 17, 1967  J. N. STACY  3,298,139
BUFFING MACHINE
Filed March 2, 1964  7 Sheets-Sheet 6

INVENTOR.
JOHN N. STACY
BY
Curtis, Morris and Safford
ATTORNEYS

Jan. 17, 1967  J. N. STACY  3,298,139
BUFFING MACHINE
Filed March 2, 1964  7 Sheets-Sheet 7
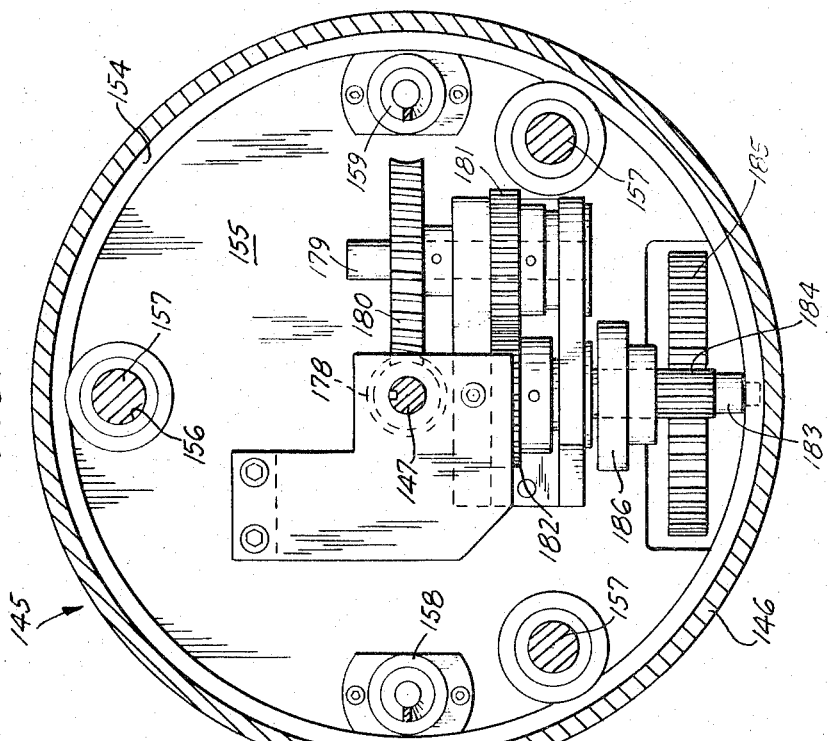
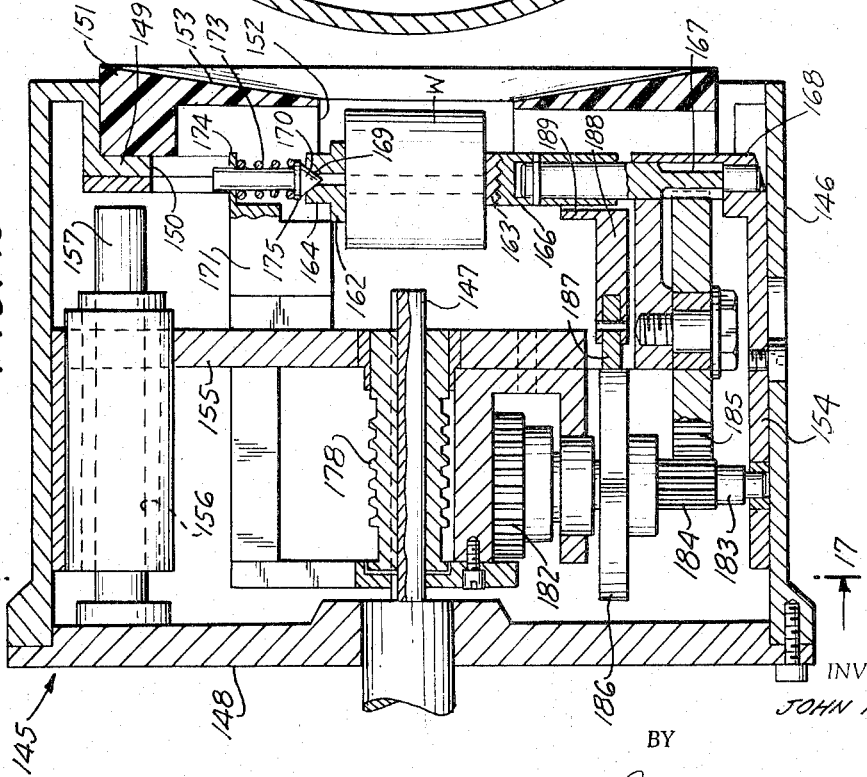
INVENTOR.
JOHN N. STACY
BY
Curtis, Morris and Safford
ATTORNEYS

United States Patent Office 3,298,139
Patented Jan. 17, 1967

3,298,139
BUFFING MACHINE
John N. Stacy, Florham Park, N.J., assignor to Stacy-Gifford Co., Linden, N.J.
Filed Mar. 2, 1964, Ser. No. 348,365
22 Claims. (Cl. 51—95)

The present invention relates to buffing and more particularly to a semi-automatic buffing machine for smoothing and polishing the surface of articles, and especially metal surfaces.

The usual practice of buffing articles requires an operator to hold the article against a buffing wheel and to press and turn the article relative to the rotating wheel. The buffing wheel is composed of a soft flexible material, usually a plurality of layers of a textile fabric stitched together, which wipe and rub the surface to be polished. Also, it is the usual practice for the operator to apply a coarse abrasive compound or rouge to the periphery of the wheel which abrades the surface of the article to make it smooth and/or color the polished surface. When a coarse abrasive compound is required to smooth the surface, the buffing or polishing operations are usually accomplished in successive steps, first on one wheel having the abrasive compound and then on a second wheel having a polishing and coloring material, such as rouge.

The success of such a manually performed buffing operation is dependent upon the skill of the operator in applying the proper amount of pressure between the article and wheel for the period of time required to produce the desired finish and so turning the article as to engage all surfaces of the article with the wheel. If the operator does not subject all surfaces of the article to a uniform action of the buffing wheel, the polish on the surface will vary and give an unattractive appearance. On the other hand, if the operator holds one area of the article against the buffing wheel for too long a period of time, the friction will produce heat to a degree sufficient to change the color of the surface which is known in the art as "burning." Furthermore, the amount of compound and rouge applied to the wheels varies the pressure and time required to polish the surface. Therefore, there is a predetermined amount of compound and rouge that should be applied to buffing wheels to produce maximum polishing in a minimum period of time without wasting the compound or rouge. It will be obvious from the above discussion that the proper buffing of an article to produce a uniform attractive finish is an art requiring a skilled operator.

Buffing machines have heretofore been proposed for mechanically performing certain buffing operations. For example, machines have heretofore been proposed for automatically controlling the feed of the abrasive compound onto the periphery of the wheel. Also machines have been provided with work holders which are rotated at a relatively slow speed relative to the buffing wheel. In some of these machines the contact of the buffing wheel with the workpiece is performed mechanically. However, these machines have not replaced manual buffing and the skilled craftsman required, nor solved the problems of manually performed buffing operations such as wasteful use of compound and rouge, nor improving the rate at which buffing operations can be performed.

One of the objects of the present invention is to provide an improved buffing machine which mechanically performs the entire buffing operation on an article by merely pushing a slide on which the article is mounted relative to a buffing wheel.

Another object is to provide a buffing machine of the type indicated for subjecting an article to be buffed to the action of a plurality of buffing wheels during a single operation of the slide to successively abrade and polish the article.

Another object is to provide a machine of the type indicated which utilizes the rotation of the buffing wheel to rotate the workpiece from zero velocity to a velocity approaching the peripheral velocity of the buffing wheel during its contact with the wheel.

Another object is to provide a machine of the type indicated for simultaneously rotating the article and moving it in two right angular directions relative to a buffing wheel.

Another object is to provide a buffing machine which utilizes the engagement of the article with the buffing wheel to rotate the article relatively to the wheel and utilizes the rotation of the article to move it laterally relative to the wheel to insure contact of all surfaces of the article with the buffing wheel during a single pass across the wheel.

Another object is to provide a buffing machine which automatically feeds the proper amount of compound and/or rouge onto the periphery of a buffing wheel during the movement of an article across the periphery of the wheel.

Another object is to provide a buffing machine of the type indicated in which the relative position of a buffing wheel and a slide on which the workpiece is mounted may be adjusted to compensate for wear and insure engagement of the article with the wheel.

Another object is to provide a buffing machine of the type indicated in which the relative adjustment of the position of the buffing wheel and slide automatically adjusts the driving mechanism to maintain the peripheral speed of the wheel substantially constant.

Still another object of the invention is to provide a machine of the type indicated which is of relatively simple and compact construction, economical to manufacture and one which is reliable in operation in performing its intended functions.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a perspective view of a machine incorporating the novel features of the present invention and shown with the slide rocked outwardly with respect to a plurality of vertically spaced buffing wheels to adapt a workpiece to be mounted thereon or removed therefrom;

FIGURE 2 is a front elevational view of the machine showing the slide rocked to a buffing position prior to a controlled guided movement across the periphery of the wheels;

FIGURE 6 is a sectional view of an electric circuit controlled by the work holding slide for intermittently advancing sticks of abrasive compound and rouge toward the respective wheels;

FIGURE 7 is a longitudinal sectional view through the work holding chuck and showing how the chuck and workpiece mounted thereon are rotated by the buffing wheel;

FIGURE 10 is a top plan view of a holder for a stick of abrasive compound and the operating mechanism for advancing the stick;

FIGURE 11 is a side elevational view of the stick feeding mechanism and showing the oscillating solenoid for turning the feed screw and the connection between the feed screw and pusher for the stick;

FIGURE 12 is a transverse sectional view taken on line 12—12 of FIGURE 10 to show the pusher connected to the feed screw and engaging the rearward side of the stick of abrasive compound;

FIGURE 13 is a schematic view showing the relation of the stick of abrasive compound with respect to the periphery of the buffing wheel as the latter decreases in size due to wear;

FIGURE 16 is a sectional view similar to FIGURE 15 taken on line 16—16 of FIGURE 14 to show the drive and cam for moving the inner casing to its lower position; and FIGURE 17 is a sectional view taken on line 17—17 of FIGURE 16 to show the driving mechanism operated by the rotation of the chuck for turning and moving the workpiece relative to the buffing wheel.

*Machine in general*

Figure 3:
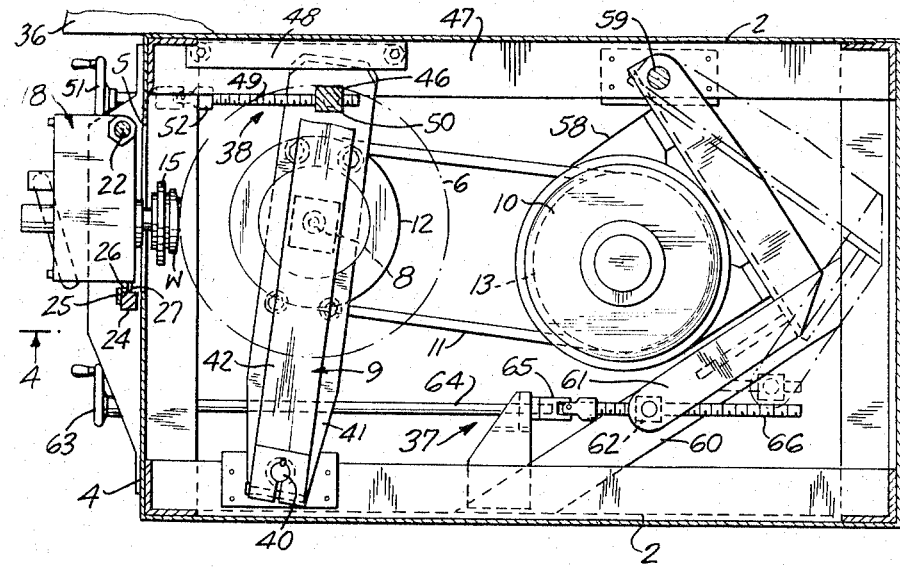
FIGURE 3 is a sectional plan view taken on line 3—3 of FIGURE 2 to show the drive for rotating the buffing wheel shaft and the adjusting mechanism for bodily moving the shaft relative to the work holding chuck and slide on which it is mounted.
Figure 5:
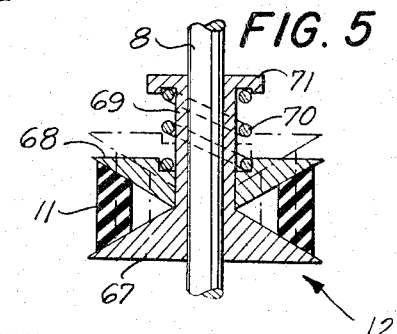
FIGURE 5 is a sectional view of the split pulley on the buffing wheel shaft for adjusting the speed of the latter to maintain a substantially constant peripheral speed of the buffing wheels.

As shown in FIGURES 1 to 4, the machine 1 comprises a frame 2 supporting a casing 3 for confining the dust, grit and metal resulting from a buffing operation. The casing 3 of the machine has a front wall 4 with an opening 5 therein at the front of a plurality of buffing wheels 6 and 7. The buffing wheels may be composed of any suitable material for wiping the surface it contacts, and preferably, each of the buffing wheels 6 and 7 comprises a plurality of layers of textile fabric sewed together to provide a flexible surface at its outer periphery. The buffing wheels 6 and 7 are mounted in spaced relation on a shaft 8 journaled in a movable bracket 9. Shaft 8 is driven from an electric motor 10 through a V-belt 11 and pulleys 12 and 13 on the shaft and motor, respectively. In the illustrated embodiment the shaft 8 is shown arranged vertically so that the wheels rotate in horizontal planes, but it will be understood that the shaft and wheels may be mounted to rotate in other positions within the scope of the present invention.

As shown in FIGURE 1 a workpiece W to be buffed is mounted on a work holder or chuck 15. Chuck 15 is rotatably mounted on a carriage 16, later to be described in detail, and projects forwardly from the carriage through a transverse slot 17 in a slide 18 at the front of the machine. As shown most clearly in FIGURE 1, slide 18 is mounted for vertical sliding and lateral pivoting movement on the front wall 4 of the casing 3. To this end, the opening 5 in the front wall 4 of the casing has a marginal frame 19 comprising a lower sill 20 and upper lintle 21 with a pivot post 22 extending therebetween at one side of the opening. The cylindrical pivot post 22 extends through a sleeve bearing 23 in one corner of the slide 18 to mount the slide for rocking movement from the position shown in FIGURE 1 to that shown in FIGURE 3 and for vertical sliding movement on the rod from the bottom to the top of the opening 5.

Extending between the sill 20 and lintle 21 of the marginal frame 19 at the opposite side of the opening 5 from the pivot post 22 is a bar 24 having a guide plate 25 mounted thereon and extending through a portion of the height of the opening 5. Guide plate 25 is in the form of an angle piece overlying the outside inner corner of the bar 24 to provide a vertically extending guide shoulder 26, see FIGURE 3, and the side of the slide opposite the sleeve bearing 23 is provided with a laterally projecting pin 27 movable under the lower end of the guide plate 25 when the slide 18 is swung inwardly for engagement with the vertically extending shoulder 26. Slide 18 is supported by a counter-weight 28 connected to the top thereof through a flexible cable 29 so that the slide may be easily swung into position to overlie the opening 5 and then moved vertically with respect to the periphery of the wheels 6 and 7. During such a pass of the slide 18, the workpiece W mounted thereon will successively engage the periphery of the wheels 5 and 6 and the path of movement of the slide is controlled by the engagement of the pin 27 with the vertically extending shoulder 26 until the pin is moved above the upper end of the guide plate 25.

Mounted on the machine at one side of each of the buffing wheels 6 and 7 are holders 32 and 33 for sticks of abrasive compound and/or rouge 34 and 35, respectively. A box 36 mounted on one side of the machine casing 3 contains control components and electric circuit connections for controlling the feeding of the sticks of compound and rouge 34 and 35 along the holders to contact the ends thereof with the peripheries of the wheels. The details of stick holding and feeding mechanism and the electric circuit and its components for feeding the sticks of compound and rouge will be later described. Suffice it to state at this time that the slide 18 constitutes a part of the electric circuit and controls the operation of the stick feeding mechanism by its vertical movement across the buffing wheels 6 and 7.

The buffing machine also includes an adjusting means 37 for adjusting the position of the driving motor 10 with respect to the shaft 8 mounting the buffing wheels 6 and 7 and an adjusting means 38 for adjusting the journal bracket 9 and shaft 8 mounted therein toward and away from the opening 5 in the front wall 4 of the machine casing 3 to compensate for the wearing away of the periphery of the buffing wheels 6 and 7. In addition, the adjusting means 38 adjust the diameter of the pulley 12 to vary the speed of rotation of the shaft 8 in accordance with the diameter of the buffing wheels 6 and 7 to maintain a substantially constant peripheral speed of the wheels contacting the work. This adjustment insures uniform buffing of the surfaces of the workpiece to polish the workpiece at a maximum rate without "burning" the workpiece.

In addition to the above features of applicant's improved machine described generally above, the arrangement is such that the chuck 15 is rotated from zero velocity by its initial engagement with the lower buffing wheel 6 as the slide 18 is moved upwardly across the periphery of the wheels to a velocity approaching the peripheral velocity of the buffing wheel which it contacts. As explained later in detail, the rotation of the chuck 15 is utilized to move the carriage 16 and chuck projecting therefrom laterally at right angles to the direction of movement of the slide 18 vertically. Thus, the workpiece W is subjected to a vertical movement with the slide 18 to successively engage the buffing wheels 6 and 7, is rotated while it is moved vertically and is also moved transversely with respect to its vertical movement to insure engagement of all surfaces of the workpiece W with the peripheries of the wheel.

*Shaft mounting and driving means*

As shown in detail in FIGURES 2 to 5, the bracket 9 in which the buffing wheel shaft 8 is journaled comprises a rock shaft 40 mounted on the machine frame 2 at one side thereof and has lower and upper arms 41 and 42 attached thereto and projecting radially therefrom, one over the other. Rock shaft 40, see FIGURE 2, is journaled in a foot bearing 43 and vertically spaced bearings 44 and 45 supported on angle iron beams of the frame 2 in vertically spaced relation above the foot bearing 43. Each radial arm 41 and 42 has a split hub 41' and 42' surrounding the rock shaft adjacent bearings 44 and 45 and the hubs are clamped to the rock shaft. The outer ends of the arms 41 and 42 are connected to each other by a strut 46 for movement as a unit. The outer free end of the lower arm 41 overlies a ledge 47 formed by the horizontal flange of an angle iron beam section of the machine frame 2, see FIGURES 2 and 3, and mounted on the ledge in spaced relation thereto is a guide plate 48 overlying the end of the arm. Thus, the journaled bracket 9 is movable as a unit about the axis of the rock shaft 40 as a center and the position of the bracket is adjusted by a screw shaft 49 extending through a threaded block 50 on the strut. A hand crank 51 is connected through a universal joint 52 to the end of the screw shaft 49 for rocking the bracket journal 9 to different positions.

Shaft 8 is journaled in lower and upper bearings 53 and 54 on the arms 41 and 42 of the journal bracket 9 for rotation thereon and movement bodily with the bracket on the rock shaft 40. Thus, as the buffing wheels 6 and 7 become worn and their diameter decreases, the position of the journal bracket 9 and shaft 8 rotatably mounted therein may be adjusted by turning the hand crank 51 to move the periphery of the buffing wheels to a position where they will contact the workpiece W to be buffed.

Figure 4:
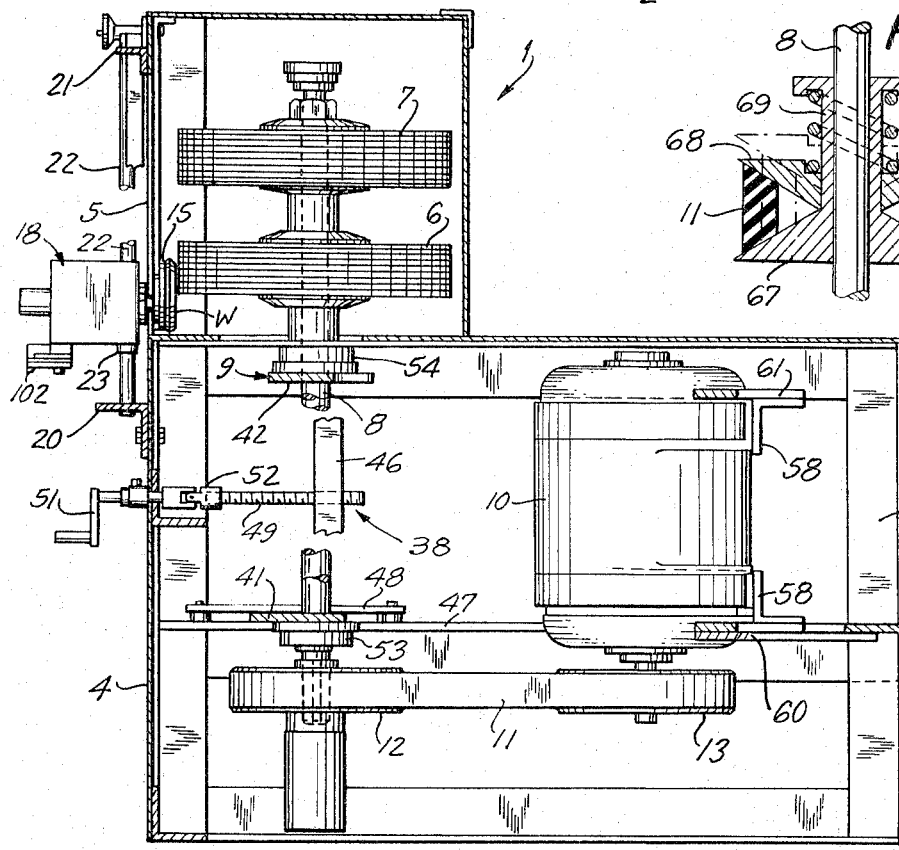
FIGURE 4 is a sectional view of the machine in side elevation and showing the relationship of the slide and work holding chuck with respect to the plurality of buffing wheels prior to the movement of the slide across the wheels.

As shown most clearly in FIGURES 3 and 4 the driving motor 10 also is mounted on a movable bracket frame 58 mounted for rocking movement on a pivot post 59 at one side of the frame. The bracket frame 58 overlies and is supported on horizontal supporting braces 60 of the frame 2 for sliding movement relative to the pivot post. The bracket frame 58 has an arm 61 at the side opposite the pivot post 59 from which a pivoted block 62 depending therefrom. The motor 10 is adjusted relative to the shaft 8 mounting the buffing wheels 6 and 7 by means of a hand crank 63 connected through a shaft 64 and universal joint 65 to a screw shaft 66 having threaded engagement with the block 62. Thus, by turning the hand crank 63 the bracket frame 58 mounting the motor 10 is rocked around the pivot post 59 toward and away from the journal bracket 9 for the shaft 8.

The shaft 8 is connected to the motor 10 by the V-belt 11 and pulleys 12 and 13 on the shaft and motor, respectively. Pulley 12 is a split pulley as shown in detail in FIGURE 5 which automatically varies its effective diameter and the rotational speed of the shaft 8 as the belt is pulled into the pulley. Thus, the speed of the pulley 12 and shaft 8 may be varied by shifting the position of motor 10 relative to shaft 8 or adjusting the shaft toward and away from the motor 10 and front wall 4 of the machine casing. The split pulley 12 as shown in detail in FIGURE 5 comprises separate flanges 67 and 68 having cooperating conical faces engaged by the V-belt 11. One of the flanges 67 of the pulley 12 has an axial sleeve 69 keyed to the shaft 8 and the other flange 68 of the pulley 12 is keyed to and slides on the sleeve 69 of the other flange. A coil spring 70 acts between the flange 68 of the pulley 12 and a collar 71 on the end of the sleeve 69 to press the flange 68 toward the flange 67. Thus, the belt 11 engages the conical faces of the pulley flanges 67 and 68 adjacent the outer periphery when the buffing wheels 6 and 7 are of maximum diameter. However, when wear occurs and the journal bracket 9 and shaft 8 mounted therein are moved away from the motor 10 the tension of the belt 11 acts to spread the flanges 67 and 68 of the pulley 12 against the spring 70 so that the belt will engage the conical faces of the pulleys at a smaller radius to thereby increase the speed of rotation of the shaft 8. The size of pulley 12 and tension of spring 70 are designed so that the increase in speed of the shaft 8 and buffing wheels 6 and 7 thereon as the shaft is moved to compensate for the smaller diameter of the buffing wheels 6 and 7 maintains a substantially constant peripheral speed of the buffing wheels at the various adjusted positions. In the same way the position of the motor 10 may be adjusted relative to shaft 8 by turning the hand crank 63 to increase or decrease the initial tension of the belt and the effective diameter of the pulley 12 to produce the desired rotational speed of the shaft 8.

*Chuck mounting*

Figure 8:
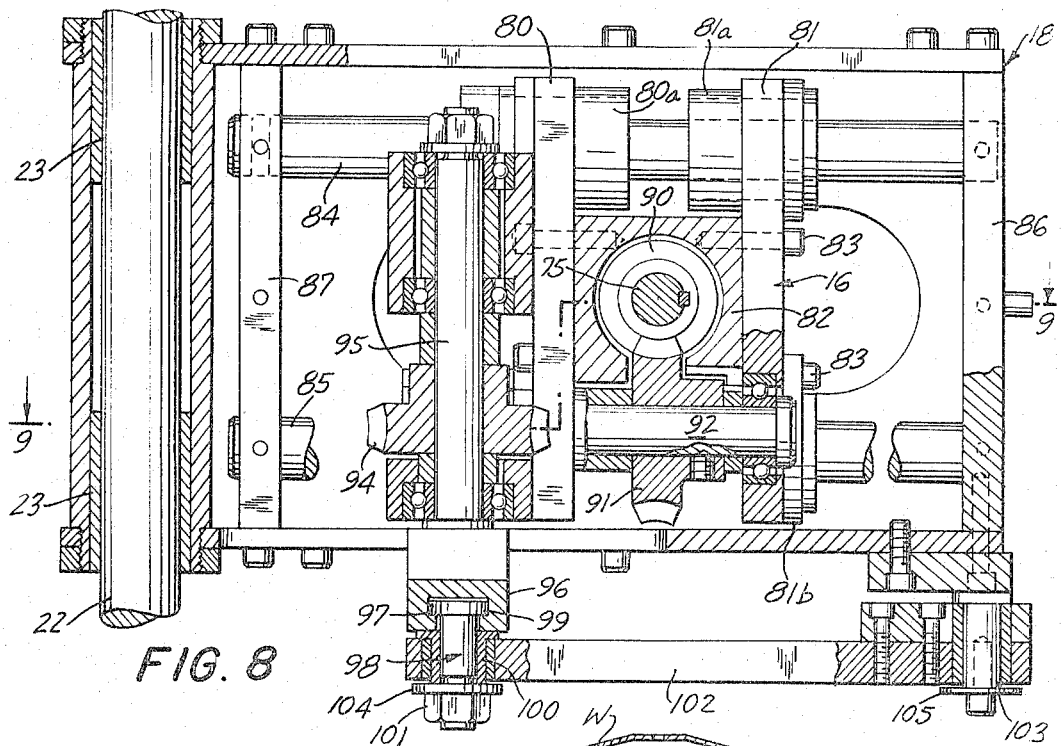
FIGURE 8 is a sectional view taken on line 8—8 of FIGURE 7 to show the worm and wheel operated by the rotating chuck for moving the carriage on which it is mounted laterally with respect to the buffing wheel.
Figure 9:
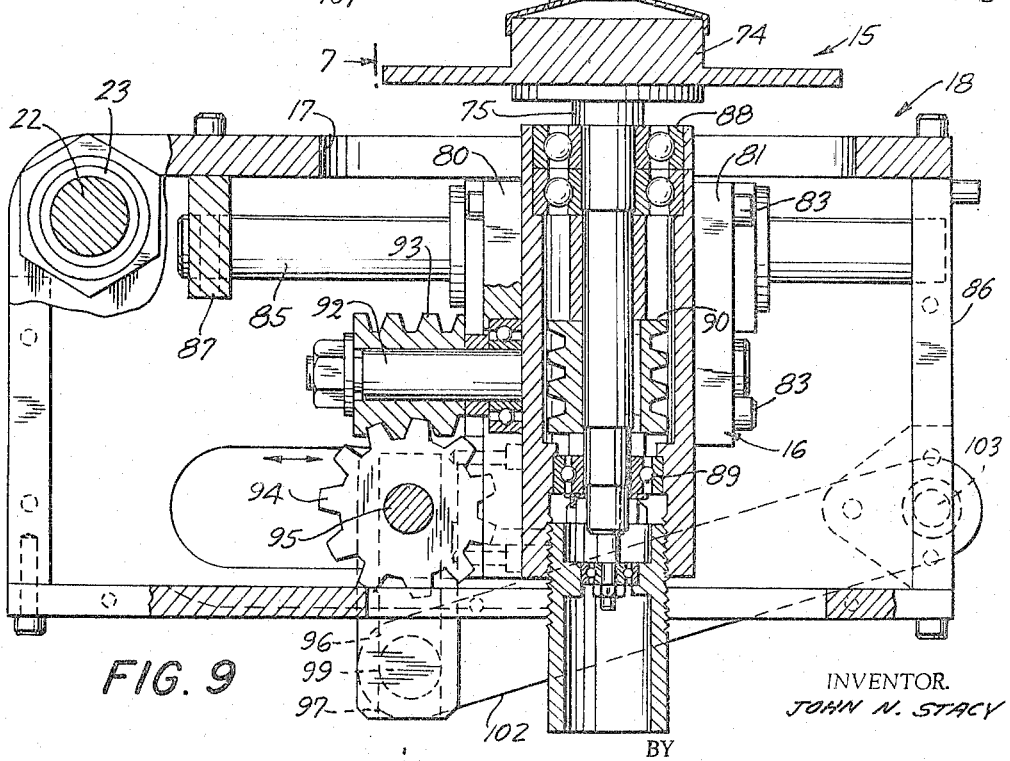
FIGURE 9 is a sectional view taken on line 9—9 of FIGURE 8 to show the worm and wheel connection for driving the crank and the link connected between the slide and carriage for moving the latter and chuck mounted thereon laterally with respect to the buffing wheel.

As shown in detail in FIGURES 7 to 9 the chuck 15 is rotatably mounted on a carriage 16 which, in turn, is movable on the slide 18 in a direction transverse to the direction of movement of the slide. Rotation of the chuck 15 operates through a driving connection between the carriage 16 and slide 18 to move the carriage and chuck on the slide.

Chuck 15 is in the form of a plate 74, see FIGURE 7, mounted on a shaft 75 projecting forwardly from the slide 18 through the transverse slot 17 therein. Mounted on the chuck plate 74 is a mandrel adapted to fit the interior of the workpiece W and having cheek elements 76 and 77 for clamping the workpiece W therebetween. Cheek element 76 is mounted in a recess on the plate and is of a form to fit the shape of the workpiece and engage a flange thereof. The opposite cheek element 77 is generally similar to the cheek 76 but made in separate parts with one part slidable with respect to the other and with guide pins 78 and spring 79 acting therebetween to press the movable cheek against the inside face of the flange at the opposite side of the workpiece W and clamp it thereto. As the chuck 15 rotates, centrifugal force acts on the movable cheek to increase the clamping force proportional to the speed of rotation of the chuck.

The carriage 16 comprises spaced plates 80 and 81, see FIGURES 7 and 8, attached to a central block 82 by means of screws 83. The plates 80 and 81 have aligned openings with sleeve bearings 80a, 80b, 81a and 81b mounted therein and slidable on rods 84 and 85 extending horizontally between a vertical side 86 and a parallel supporting wall 87 in the slide 18. Thus, the carriage 16 is slidable bodily on the space rods 84 and 85 transversely of the slide 18 and the pivot post 22.

Chuck shaft 75, see FIGURE 9, is journaled in bearings 88 and 89 in an opening in the block 82 and has a worm 90 between the bearings in meshing engagement with a worm wheel 91, see FIGURES 8 and 9. Worm wheel 91 is mounted fast on a transverse shaft 92 journaled in the side plates 80 and 81 on the carriage 16 and the transverse shaft, in turn, has a worm 93 in meshing engagement with a worm wheel 94 on a crank shaft 95 journaled on the carriage. Crank arm 96 is keyed to the crank shaft 95, see FIGURES 7 and 8, and has a T-shaped slotted groove 97 in the under side thereof for a crank pin 98 having an enlarged head 99 slidable in the slot with the pin depending from the slot. Surrounding the pin 98 is a sleeve 100 which bears against the crank arm 96 and a nut 101 screwed onto the thread end of the crank pin clamps the assembly of pin and sleeve in adjusted position on the crank arm 96. A connecting rod 102 extends between the crank pin 98 and a pin 103 projecting from the bottom of the slide 18. As shown in FIGURE 8, the sleeve 100 of the crank pin 98 is journaled in one end of the connecting rod 102 while a sleeve on the fixed pin 103 is journaled in the opposite end of the rod and the rod is held in position on the pins by washers 104 and 105.

Thus, the initial engagement of the chuck 15 with the lower buffing wheel 6, see FIGURE 7, as the slide is moved across the periphery of the wheels produces a rotation of the chuck and workpiece thereon. For example, the buffing wheel may be rotating at a speed to produce a peripheral speed of 9000 feet per minute for buffing a particular workpiece. The engagement of the wheel with the chuck aod workpiece W then rotates the latter from zero velocity to a high velocity approaching the peripheral velocity of the buffing wheel, such as 5000 feet per minute, during its contact with the wheel. Rotation of the chuck 15 is transmitted through the chuck shaft 75 to rotate the worm 90 thereon, see FIGURES 8 and 9, and worm wheel 91 in meshing engagement therewith to turn the transverse shaft 92. The worm 93 on shaft 92 then turns the worm wheel 94 on crank shaft 95 to rock the crank arm 96. Rocking movement of the crank arm 96 acting through the connecting rod 102 and fixed pin 103 on the slide then bodily moves the carriage 16 transversely of the direction of movement of the slide. It will be observed, therefore, that the rotary movement of the chuck 15 and workpiece W, the vertical movement of the workpiece with the slide and the horizontal movement of the workpiece on the carriage 16 relative to the slide and buffing wheels 6 and 7 insures engagement of all surfaces of the workpiece by the buffing wheels.

*Compound and rouge feeding mechanisms*

The holders 32 and 33 for the sticks of abrasive compound 34 and 35, respectively, are of identical form and shown in detail in FIGURES 10 to 13. For purposes of description the holder 32 shown in FIGURES 10 to 13 will be described as the one for compound 34, but it will be understood that the description applies equally as well to holder 33 for the stick of rouge 35. Holder 32 comprises a hollow and generally rectangular casing supported from a side wall of the machine 1 by a bracket 106, see FIGURE 1, attached to the front wall 4 of the machine casing 3 and bottom of the holder casing. A door 107 is provided in the machine casing 3 at the rear of the holders 32 and 33 to adapt the sticks of compound and rouge to be inserted into the respective holders.

The stick of compound 34 is held against one side 108 of the holder 32 by means of spring pressed plungers 109, see FIGURE 12, and the stick is advanced by a pusher 110 at the rear of the stick. As shown most clearly in FIGURES 11 and 12 the pusher 110 extends downwardly through a slot 111 in the top wall 112 of the holder to engage the rearward end of the stick and also extends upwardly above the top wall. The pusher 110 is advanced by a screw shaft 113 having a threaded engagement with a tapped hub 114 on the upwardly projecting portion of the pusher. The tapped hub 114 is split and comprises opposed jaws 115 and 116 pivotally mounted on a pin 118 projecting rearwardly from the upper portion of the pusher. A swinging bolt 119 on one of the jaws 116 extends through a slot 120 on the other jaw and the two jaws are clamped to each other to form the hub by means of a wing nut 121 screwed onto the swinging bolt 119. When a stick of abrasive compound 34 is to be inserted in the holder 32, the wing nut 121 is backed off the swinging bolt 119 to release the jaws 115 and 116 which are then swung away from the threaded shaft 113. The assembly of jaws 115, 116 and pusher 110 is moved rearwardly until it aligns with a slot 122 in the top and side walls of the holder. Pusher 110 is swung outwardly through slot 122 to permit the stick to be inserted. After a stick of compound 134 has been inserted into the holder 32 through its open end, the pusher 110 is swung back through the slot 122 and moved forwardly to a position at the rear of the stick and the jaws 115 and 116 swung into clamping engagement with the threaded shaft 113 by screwing up the wing nut 121 on the swinging bolt 119.

Threaded shaft 113 is mounted for rotation in bearing brackets 123 and 124 on the top wall 112 of the holder 32. An oscillating solenoid 125 is connected to the forward end of the shaft 113 and is adapted when energized to rock the shaft through a predetermined angular increment of movement. A ratchet wheel 126 is mounted at the opposite end of the threaded shaft 113 adjacent the bearing bracket 124 which is engaged by a pawl 127 to prevent a reverse movement of the threaded shaft after it has been actuated by solenoid 125. The oscillating solenoid 125 and pitch of the threads on the screw shaft 113 may be designed so that each energization of the solenoid will advance the pusher 110 in a range of from .0001 to .0015 inch depending upon requirements. Such movement of the pusher 110, in turn, advances the stick of abrasive compound 34 a corresponding amount. The engagement of the end of the stick with the periphery of the wheel 6 causes the compound to be removed from the end of the stick and applied to the periphery of the wheel.

Any suitable control mechanism may be provided for intermittently energizing the oscillating solenoid 125 to advance the stick of compound 34 at the required rate. One form of electric control for this purpose is illustrated in FIGURE 6 of the drawings. This arrangement comprises continuously operating timing switches 130 and 131 for controlling the feeding of compound and rouge and solenoid operated relays 132 and 133 connected in series with the switches 130, 131 and oscillating solenoids 125 and 125a, respectively. Each timing switch 130 and 131 may be of the "microswitch" type and comprises a rotating cam 130a and 131a, respectively, each having a plurality of lobes and engaging and operating a movable switch contact 130b and 131b. These cam operators are driven continuously while the machine is in operation, but a circuit is completed through relay switches 132 and 133 to the respective rotating oscillating solenoids 125 and 125a only when the slide 18 is moved in a path across the periphery of the buffing wheels 6 and 7. To this end, vertically spaced switch contacts 134 and 135 are provided on the guide plate 25 for the slide and the pin 27 on the slide 18 constitutes the other contact to complete a circuit to the oscillating solenoids 125 and 125a. Electric current is supplied from power lines 136 and 137 to the primary winding 138 of a transformer. The secondary winding 139 of the transformer is connected between a ground G and a rectifier 140. A branch circuit from the rectifier 140 then connects the timing switch 130, relay switch 132 and oscillating solenoid 125 in series. Another branch circuit connects the timing switch 131, relay switch 133 and oscillating solenoid 125a in series. In addition, branch circuits connect the outlet from the rectifier 140 with the coils of the relays 132 and 133 and spaced contacts 134 and 135 closed by movement of slide 18. It will be understood that the control circuit may take other forms and that a full wave rectifier would be used when direct current polarized solenoids 125 and 125a are used.

From the above description it will be apparent that upon movement of the slide 18 to a position overlying the opening 5 in the front wall 4 of the machine casing 3 and upwardly across the guide plate 25, the pin 27 on the slide 18 will engage contact 134 and complete a circuit from the rectifier 140 through the coil of relay 132. Closing of the relay switch 132 will complete a circuit from the timing switch 130 to the oscillating solenoid 125. Energization of the oscillating solenoid 125, see FIGURE 10, will rotate the screw shaft 113 to advance the pusher 110 and stick of compound 34. Solenoid 125 will continue to be operated intermittently by the lobes of cam 130a as long as the slide 18 is engaged with the switch contact 134. However, when the slide 18 and workpiece W thereon have passed by the wheel 6, the pin 27 on slide 18 disengages the switch contact 134 to discontinue the advance of the stick of compound 34. Continued upward movement of the slide 8 engages the pin 27 with the switch contact 135 and energizes the coil of relay switch 133 and completes a circuit to the oscillating solenoid 125a and advances the stick of rouge 35. After the slide 8 has completed a pass beyond the upper wheel 7 the pin 27 on the slide 18 disengages the switch contact 135 to discontinue the feeding of rouge against the periphery of the wheel.

Mode of operation

To initiate operation of the buffing machine 1 the slide 18 is swung outwardly on the pivot post 22 to the position illustrated in FIGURE 1, a switch is closed to initiate operation of the motor 10 to drive the wheel shaft 8 and a circuit is completed to initiate operation of the cams 130a and 131a of the timing switches 130 and 131, see FIGURE 6. For purposes of description it is assumed that the buffing wheels 6 and 7 are relatively new and have a maximum diameter and the position of the motor 10 has been adjusted by the hand crank 63 for spreading the split pulley 12 to produce a desired peripheral speed of the buffing wheels.

A workpiece W is then mounted on the chuck 15 by pressing the movable cheek 77 of the work mounting mandrel inwardly to engage the flanges of the workpiece. The workpiece W is then released and gripped by the opposed cheek elements 76 and 77 to attach it to the chuck for a buffing operation.

Slide 18 is then slid downwardly on the pivot post 22 until the pin 27 projecting from its side is located below the guide plate 25 at which time the slide is swung inwardly and the pin engaged at the rear of the vertical shoulder 26 of the guide plate. Slide 18 is then moved upwardly to move the workpiece W vertically across the periphery of the buffing wheels 6 and 7. During the first increment of movement the upper edge of the chuck 15 and workpiece thereon is engaged with the lower buffing wheel 6 as shown in FIGURE 7 which buffs the workpiece by wiping and rubbing the surface thereof and transmits motion to rotate the chuck 15 from zero velocity to a velocity approaching the peripheral velocity of the wheel. Continued upward movement of the slide 18 causes continued buffing of the surface of the workpiece as it rotates at high speed with respect to the periphery of the wheel to buff different surfaces of the workpiece in progressively changing directions. Rotation of the chunk 15 and workpiece W continues until the center of the workpiece is located at the center of the buffing wheel 6 which tends to slow the rotation of the chuck and workpiece. Continued movement of the slide upwardly produces rotation of the chuck and workpiece W from zero to a high velocity in the opposite direction with a buffing action in two other directions of movement, which further tends to produce a uniformly smooth and polished surface.

In addition to vertical movement with the slide 18 and rotary movement with the chuck 15, the workpiece W, also, is moved in a horizontal direction at right angles to the vertical movement of the slide. This results from the rotation of the chuck 15, see FIGURES 7 to 9, which operating through the shaft 75, worm 90 thereon, worm wheel 91 on lay shaft 92, worm 93 on lay shaft 92, and worm wheel 94 on crank shaft 95 rocks the crank arm 96. Crank arm 96 acting between the crank pin 98 and link 102 connected to the pin 103 on slide 18 moves the carriage 16 along the rods 84 and 85 on the slide. Thus, the workpiece is moved horizontally as well as vertically during its rotation to insure buffing of all of its surfaces in different directions of movement.

As the upward movement of the slide 18 is continued the chuck 15 and workpiece W thereon pass across the periphery of the second buffing wheel 7. Buffing wheel 6 has a coarse grinding compound applied thereto for abrading and polishing the surface of the workpiece W while the upper wheel 7 has a fine rouge thereon which produces less abrading and more polishing. In addition, the rouge gives the buffed surface an attractive appearance and color. During the movement of the slide 18 across the periphery of the upper wheel 7 the same functions take place as described with respect to the wheel 6. In other words, the wheel 7 rotates the chuck 15 as it is moved vertically and the rotation of the chuck is transmitted through the drive to move the chuck and workpiece horizontally to insure contact of all surfaces of the workpiece by the periphery of the buffing wheel. After the slide 18 has moved past the guide plate 25 it can be swung outwardly to the position illustrated in FIGURE 1, the workpiece W removed and a new workpiece mounted on the chuck.

During the first increment of upward movement of the slide 18 in the guide 25, the pin 27 on the slide engages the contact 134, see FIGURE 6, to energize the oscillating solenoid 125, see FIGURE 11, to turn the screw shaft 113 and advance the pusher 110 and stick of compound 34 and thereby engage its end with the periphery of the wheel 6. Referring back to FIGURE 6, each time a lobe of the cam 130a of the timing switch 130 engages the contact 130b a circuit is completed to the oscillating solenoid 125 so that the stick of compound 34 is intermittently advanced so long as the slide 18 contacts the lower wheel 6. As the slide 18 continues its upward movement the pin 27 disengages contact 134 to discontinue feeding of stick of compound 34; and engages the contact 135 in series with the timing switch 131 to intermittently operate the oscillating solenoid 125a to advance the stick of rouge 35 and engage its end with the periphery of the buffing wheel 7.

During operation of the machine 1, the buffing wheels 6 and 7 become worn and it is then necessary to move the wheels toward the slide 18 to insure engagement of the periphery of the wheels with the surface of the workpiece W. This is accomplished by turning the hand crank 51 which operating through the screw shaft 49, rocks the journal bracket 9 and shaft 8 towards the chuck 15, see FIGURE 3. Such movement of the journal bracket 9 increases the tension of the V-belt 11 which spreads the split pulley 12 and reduces its effective diameter. The tension of the spring 70 and the slope of the conical sides of the pulley flanges 67 and 68 are so designed as to increase the speed of the pulley 12 and shaft 8 which it drives in proportion to the decrease in diameter of the wheels 6 and 7 to maintain a substantially constant peripheral speed of the wheels.

Modified chuck

FIGURES 14 to 17 illustrate a chuck of modified construction for mounting a workpiece W of irregular shape and moving it so as to present successive surfaces for contact by the buffing wheels 6 and 7. The modified chuck 145 may be used in place of the chuck 15 in certain instances or may be used in combination with the chuck 15 by mounting it at the outer end thereof for movement therewith. Also, chuck 145 and shaft 147 may be mounted on a slide 18 the same as chuck 15, previously described, or may be mounted in some other way to engage the workpiece W thereon with a buffing wheel.

Chuck 145 comprises an outer casing 146 mounted to rotate on a stationary axial shaft 147. Outer casing 146 has a back plate 148 at one end and a front plate 149 at the opposite end and the front plate is provided with an opening 150 in which the workpiece W is located. Front plate 149 is depressed from the periphery of the outer casing 146 and a guide shield 151 is located on the front plate 149 within the peripheral flange formed thereby. Guide shield 151 also has an opening 152 therein in which a surface of the workpiece W is centered flush with its front curved surface 153.

Slidably mounted in the outer casing 146 is an inner casing 154 having a cylindrical wall with a sliding fit in the peripheral wall of the outer casing. Inner casing 154 has a diaphragm 155 with holes 156 through which guide pins 157 extend from the back plate 148 of the outer casing 146. Thus, the inner casing 154 is mounted to slide on the guide pins 157 of the outer casing 156 and is rotatable therewith. A pair of springs 158 and 159 act between the back plate 148 of the outer casing 146 and the diaphragm 155 of the inner casing 154 to move the latter outwardly with respect to the back plate of the outer casing.

Figure 15:
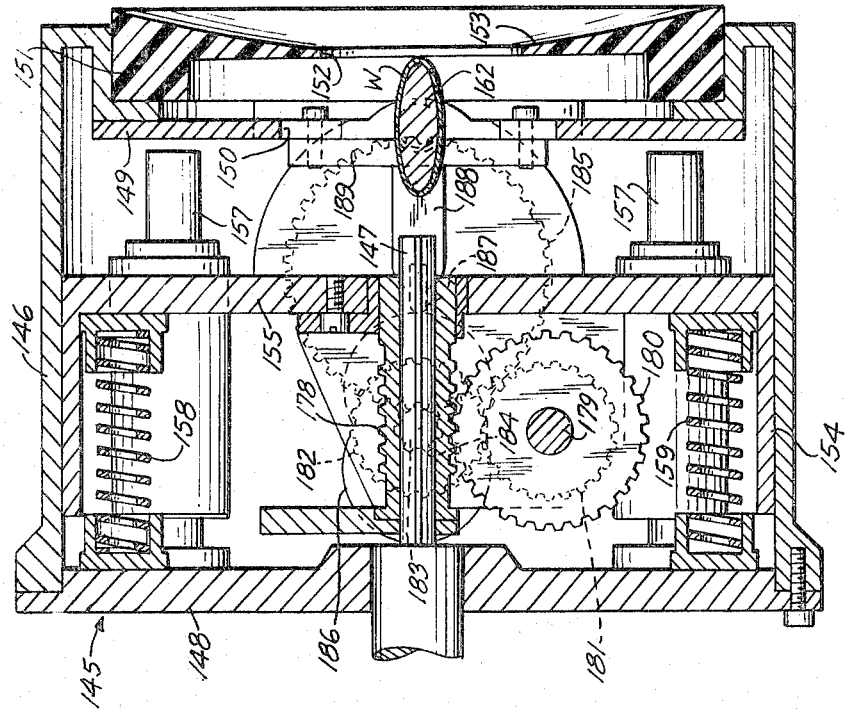
FIGURE 15 is a transverse sectional view through the work holding chuck illustrated in FIGURE 14 and showing the inner casing mounting the workpiece for movement relative to the outer casing and springs for moving the inner casing in one direction.
Figure 14:
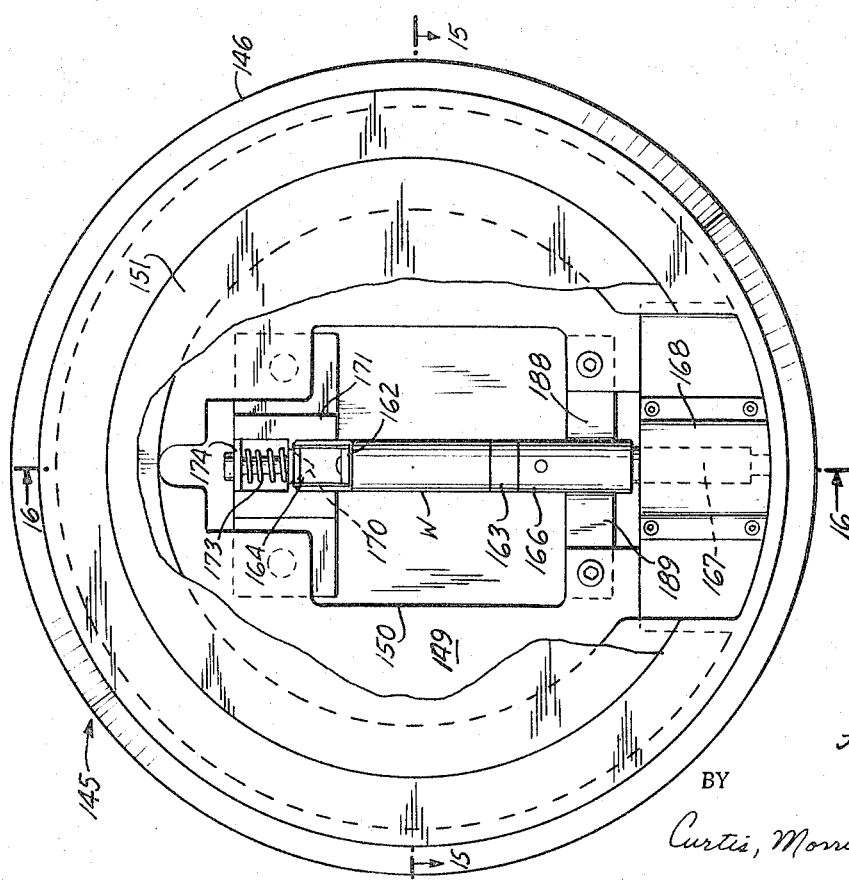
FIGURE 14 is a front view partly broken away of a work holding chuck of modified construction for turning a workpiece of irregular shape to present successive surfaces of the workpiece to the action of the buffing wheel at the same location.

An irregular shaped workpiece W, such as the cigarette case of oval cross section illustrated in FIGURES 14 and 15, is mounted on a fixture 162 having stub shafts 163 and 164 projecting from opposite ends. Stub shaft 163 is engaged by a live center 166 at the end of a spline shaft 167 journaled in a bearing sleeve 168 projecting inwardly from the top of the wall of the inner casing 154. The opposite stub shaft 164 has a conical recess 169 at its axis for engagement by a dead center 170 at the upper end of a pedestal 171. A spring 173 extends between shoulders 174 and 175 on the pedestal 171 and dead center 170 for moving the center into engagement with the conical recess, but permitting axial movement thereof against the action of the spring for the insertion and removal of workpieces W therefrom. Thus, the fixture 162 and centers 166 and 170 clamp a workpiece in position on the chuck.

A drive is provided which utilizes the turning movement of the chuck 145 to rotate and raise and lower the workpiece W to present successive areas of its surface to the action of the buffing wheel at the same level and flush with the curved surface 153 of the guide shield 151. As shown most clearly in FIGURES 15 to 17, the drive includes a worm 178 keyed to the stationary axial shaft 147. A lay shaft 179 is journaled in bearings in the inner casing 154 and has a worm wheel 180 in meshing engagement with the worm 178. Thus, when the chuck 145 rotates around the worm 178, the worm wheel 180 will be turned and turn the shaft 179 on which it is mounted. A gear 181 mounted on shaft 179 meshes with a gear 182 on a second lay shaft 183 journaled in the inner casing 154. A pinion 184 fast on the outer end of the lay shaft 183 meshes with an intermediate idler gear 185 which, in turn, meshes with the spline shaft 167 to turn the latter and the workpiece W connected between it and the dead center 170. In addition, the lay shaft 183 mounts a cam 186 for engaging a cam follower 187 at the lower end of a bracket 188 having a T shaped end 189 attached to the front plate 149 of the outer casing 146 and underlying the stub shaft 163. Thus, cam 186 engaging the cam follower 187 on the stationary bracket 188 and springs 158 and 159 acting between casing sections 146 and 154 raise and lower the inner casing as the workpiece is rotated. Furthermore, the cam 186 has a peripheral contour corresponding to the shape of the workpiece W to be buffed so as to raise and lower the inner casing 154 in timed relation to the rotation of the workpiece W to present successive areas of its surface flush with the upper surface 153 of the guide shield 151.

The chuck 145 with a workpiece W mounted thereon presents a surface of the workpiece in the opening 152 in the guide shield 151. When a buffing wheel contacts the front of the chuck it produces rotation of the chuck and engages the periphery of the buffing wheel with the exposed surface of the workpiece to buff the surface. Rotation of the chuck 145 around the fixed worm 178 rotates the worm wheel 180 and shaft 179 and through gears 181 and 182 rotates lay shaft 183. Pinion 184 on lay shaft 183 rotates the intermediate gear 185 to rotate spindle 167 and workpiece W. Simultaneously, cam 186 raises and lowers the workpiece W so as to present successive areas of the surface to be buffed at the same level in the opening 152 for contact by the buffing wheel.

*Summary*

It will now be observed that the present invention provides an improved buffing machine for mechanically performing the entire buffing operation on an article when a slide is manually actuated by an unskilled operator in a path across the buffing wheel. It, also, will be observed that the present invention provides a machine for successively buffing an article with a coarse abrasive compound and a polishing rouge as the slide is moved across the periphery of successive buffing wheels. It also will be observed that the present invention provides a work holding chuck for rotating the article and moving it in two right angular directions relative to a buffing wheel. It also will be observed that the present invention provides a machine in which the rotation of the buffing wheel is used to rotate the article to be buffed and the rotation of the article moves it laterally with respect to the buffing wheel to insure contact of all surfaces of the article with the buffing wheel during a single pass across the wheel. It also will be observed that the buffing machine of the present invention automatically feeds the proper amount of compound and rouge onto the periphery of successive buffing wheels during a buffing operation. It will be further observed that the buffing wheel and slide on which the workpiece is mounted may be adjusted relative to each other to compensate for wear which, in turn, automatically adjusts the driving mechanism to maintain the peripheral speed of the wheel substantially constant. It will still further be observed that the present invention provides a buffing machine which is of relatively simple and compact in construction, economical to manufacture and one which is reliable in operation to perform its intended functions.

While a single embodiment of a machine incorporating the present invention is herein illustrated and described it will be understood that further changes may be made in the construction and arrangement of elements without departing from the spirit or scope of the present invention. Therefore, without limitation in this respect, the invention is defined by the following claims.

I claim:

1. In a buffing machine, a frame, a shaft mounted to rotate in said frame and having a buffing wheel mounted thereon for rotation therewith, driving means for rotating the shaft, a stick of abrasive compound mounted on the frame for movement toward the periphery of the buffing wheel to engage it therewith, a rotatable chuck for mounting a workpiece so as to engage the latter with the periphery of the buffing wheel eccentrically of its axis to rotate the chuck and workpiece relative to the buffing wheel, means operated by the rotation of the chuck to move the workpiece relative to the buffing wheel, means operated by the movement of the chuck relative to the buffing wheel for feeding the stick of abrasive toward the buffing wheel at a predetermined rate, adjusting means for relatively moving the chuck and buffing wheel to insure engagement of the latter with the workpiece as the diameter of the wheel decreases due to wear, and means operated by the relative movement of the chuck and buffing wheel for varying the speed of the shaft to maintain the peripheral speed of the buffing wheel substantially constant at varying diameters.

2. In a buffing machine, a frame, a shaft mounted to rotate in said frame and having a plurality of buffing wheels mounted thereon in spaced relation for rotation therewith, driving means for rotating the shaft, a chuck for mounting a workpiece, said chuck being mounted for movement relative to the buffing wheels to engage the peripheries of the buffing wheels successively, a stick of abrasive compound mounted on the frame for movement toward the periphery of one of the buffing wheels to engage its end therewith, a stick of rouge mounted on the frame for movement toward the periphery of another buffing wheel to engage its end therewith, means controlled by the movement of the chuck relative to the buffing wheels for feeding the sticks of abrasive and rouge toward the respective wheels at a predetermined rate, means for bodily moving the wheels relative to the chuck to insure engagement of the buffing wheels with the workpiece as the diameter of the wheels decrease due to wear, and means operated by the relative movement of the wheels and chuck for varying the speed of the shaft to maintain the peripheral speed of the buffing wheels substantially constant at varying diameters.

3. In a buffing machine, a frame, a bearing bracket mounted for movement on said frame, a shaft rotatably mounted in said bearing bracket and having a buffing wheel mounted thereon for rotation therewith, a split pulley mounted on said shaft and having a laterally movable side to vary the effective diameter of the pulley, driving means including a pulley, a V-belt connecting the pulleys on the driving means and shaft, a stick of abrasive compound mounted on the frame for movement bodily toward the periphery of the buffing wheel to engage its end therewith, a rotatable work holder mounted for sliding movement in one direction to engage the workpiece thereon with the periphery of the wheel eccentrically to rotate it and the work holder relative to the rotating buffing wheel, means operated by the rotation of the work holder to move it and the workpiece bodily relative to the buffing wheel in a direction transversely of said one direction, means operated by the movement of the work holder relative to the buffiing wheel in said one direction for feeding the stick of abrasive toward the buffing wheel with a predetermined increment of movement, means for adjusting the position of the bearing bracket toward the workpiece to compensate for wear and insure engagement of the wheel with the workpiece, and said means for adjusting the position of the bearing bracket spreading the split pulley on the shaft whereby to automatically increase the speed of rotation of the shaft and maintain the peripheral speed of the buffing wheel substantially constant at varying diameters.

4. In a buffing machine, a frame, a bearing bracket mounted for movement on said frame, a shaft rotatably mounted in said bearing bracket and having a buffing wheel mounted thereon for rotation therewith, driving means including a split pulley mounted on said shaft and having a laterally movable side and a V-belt for engaging said pulley at varying tensions to vary the effective diameter of the pulley, a chuck for mounting a workpiece, said chuck being mounted for movement in a path across the periphery of the buffing wheel for engagement therewith, a stick of abrasive compound mounted on the frame for movement toward the periphery of the buffing wheel to engage its end therewith, means operated by the movement of the work holder in said path across the periphery of the buffing wheel for intermittently feeding the stick of abrasive toward the buffing wheel, means for adjusting the bearing bracket toward the chuck to insure engagement of the periphery of the wheel with the workpiece as the diameter of the wheel decreases due to wear, and said means for adjusting the position of the bearing racket spreading the split pulley to automatically increase the speed of rotation of the shaft as the diameter of the buffing wheel decreases to maintain the peripheral speed of the buffing wheel substantially constant at varying diameters.

5. In a buffing machine, a frame, a bearing bracket mounted for movement on said frame, a shaft rotatably mounted in said bearing bracket and having a buffing wheel mounted thereon for rotation therewith, driving means for the shaft including a V-belt and a split pulley on the shaft having a laterally movable side to vary the effective diameter of the pulley, a rotatable work holder mounted for sliding movement in a path across the periphery of the buffing wheel eccentric to its axis to rotate the work holder and workpiece thereon relative to the buffing wheel, means operated by the rotation of the work holder to move it in a second path at an angle to the first path of movement, means for adjusting the position of the bearing bracket toward the work holder to compensate for wear and insure engagement of the wheel with the workpiece, and said means for adjusting the position of the bearing bracket actuating the split pulley to vary the speed of rotation of the shaft in accordance with variations in the diameter of the buffing wheel to maintain the peripheral speed of the buffing wheel substantially constant at varying diameters.

6. In a buffing machine, a frame, a shaft rotatably mounted in said frame and having a buffing wheel mounted thereon for rotation therewith, driving means for rotating the shaft and buffing wheel, a rotatable chuck for mounting a workpiece, said chuck being mounted for sliding movement bodily in one direction to engage the workpiece with the periphery of the wheel eccentrically to rotate the chuck relative to the rotating buffing wheel, means operated by the rotating chuck to move it in another direction angularly related to said one direction of movement, a stick of abrasive compound mounted on the frame for movement toward the periphery of the buffing wheel to engage its end therewith, and means controlled by the movement of the chuck relative to the buffing wheel in said one direction for feeding the stick of abrasive toward the buffing wheel with a predetermined increment of movement.

7. In a buffing machine, a frame, a shaft rotatably mounted in said frame and having a buffing wheel mounted thereon for rotation therewith, driving means for rotating the shaft, a slide mounted on the frame for movement parallel with the axis of the shaft, a chuck rotatably mounted on said slide for bodily movement therewith and for movement relative thereto in a direction transverse to the direction of movement of the slide, said chuck being so located on the slide as to engage the periphery of the buffing wheel eccentrically to rotate the chuck and workpiece mounted thereon relative to the buffing wheel, means operated by the rotation of the chuck to move it transversely of the slide, a stick of abrasive compound mounted for sliding movement on the frame toward the periphery of the buffing wheel to engage its end therewith, and means controlled by the movement of the slide relative to the buffing wheel for feeding the stick of abrasive toward the buffing wheel at a predetermined rate.

8. A buffing machine in accordance with claim 7 in which a plurality of buffing wheels are mounted on the shaft in spaced relation for rotation therewith, the stick of abrasive compound cooperating with one of the wheels, a stick of rouge mounted on the frame for movement toward the periphery of the other buffing wheel to engage its end therewith, said frame having guides for mounting the slide for movement in a predetermined path parallel with the axis of the shaft, said means for feeding the stick of abrasive comprising a solenoid for each of the sticks of compound and rouge for advancing its stick a predetermined increment of movement for each energization, an electric circuit having separate branches for energizing the solenoids, and a switch in each of the branches operated by the slide as it is moved relative to the wheels.

9. A buffing machine in accordance with claim 8 in which the shaft is arranged vertically, the slide being mounted for vertical movement parallel with the shaft, and the chuck being mounted for vertical movement with the slide and horizontal movement on the slide.

10. A buffing machine in accordance with claim 9 in which the stick of abrasive compound is mounted to slide in a channel having a slot in one side extending longitudinally thereof, a pusher at the rear of the stick for advancing the stick, a feed screw rotatably mounted on the channel and having threaded engagement with the pusher, and said solenoid being connected to rotate the screw through a predetermined angle for each actuation.

11. In a buffing machine, a frame, a bearing bracket mounted for movement on the frame, a vertical shaft rotatably mounted in said bearing bracket and having a buffing wheel mounted thereon for rotation therewith, a slide mounted for movement relative to the buffing wheel, a chuck mounted in the slide for holding a workpiece thereon, driving means for rotating the shaft, adjusting means for moving the bearing bracket relative to the buffing wheel to insure engagement of the buffing wheel with the workpiece as the diameter of the wheel decreases due to wear, and means operated by the movement of the bracket frame for varying the speed of rotation of the shaft to maintain the peripheral speed of the buffing wheel substantially constant at varying diameters.

12. A buffing machine in accordance with claim 11 in which the driving means includes a split pulley on the shaft, a V-belt driving the pulley, and said belt spreading the split pulley as the bearing bracket and shaft are moved toward the slide to compensate for wear.

13. A buffing machine in accordance with claim 11 in which the driving means includes an electric motor, means for mounting the motor for movement relative to the bearing bracket to spread the split pulley and initially adjust the speed of the shaft.

14. In a buffing machine, a frame, a shaft rotatably mounted in said frame and having a buffing wheel mounted thereon for rotation therewith, a slide mounted on said frame for sliding movement in one direction across the periphery of the buffing wheel, a work holding chuck rotatably mounted in the slide for engagement by the buffing wheel to rotate the chuck, and means operated by the rotation of the work holding chuck to move it on the slide in a direction transverse to said one direction of movement as the slide is moved across the periphery of the buffing wheel.

15. A buffing machine in accordance with claim 14 in which the chuck is rotatably mounted in a carriage on the slide, means in the slide for mounting the carriage for movement laterally of the slide, a crank on the carriage, a link connecting the crank and slide, and gearing between the rotatable chuck and crank for rotating the crank and reciprocating the carriage on the slide.

16. A buffing machine in accordance with claim 14 in which the slide is mounted on a post at one side for sliding and rocking movement, a pin projecting from the opposite side of the slide, a track on the frame for engagement by the pin to adapt the slide to be moved in a predetermined path, and a counterweight connected to the slide whereby to adapt the slide to be moved manually in a predetermined path along one side of the frame relative to the rotating buffing wheel.

17. In a buffing machine, a frame, a shaft rotatably mounted in said frame and having a buffing wheel mounted thereon for rotation therewith, driving means for rotating the shaft and buffing wheel, a stick of an abrasive compound mounted on said frame for movement bodily toward the periphery of the buffing wheel to engage its end therewith, a slide mounted on said frame and having means for mounting a workpiece thereon for movement in a path across the periphery of the buffing wheel, and means controlled by the movement of the slide relative to the buffing wheel for feeding the stick of abrasive toward the buffing wheel.

18. A buffing machine in accordance with claim 17 in which the stick feeding means comprises a pusher for the stick, means including a solenoid for actuating the pusher, and an electric circuit including said solenoid and a switch actuated by the slide as it moves in a path across the periphery of the buffing wheel to energize said solenoid.

19. In a buffing machine, a frame, a shaft mounted to rotate on said frame and having a buffing wheel mounted thereon for rotation therewith, driving means for rotating said shaft, a rotatable chuck mounted for engagement by the buffing wheel eccentrically of its axis to rotate the chuck and workpiece thereon, means for mounting a workpiece on the chuck for rotation thereon and movement longitudinally thereof, driving means operated by the rotation of the chuck and connected to rotate the workpiece on the chuck, spring means acting on the workpiece mounting means to move it and the workpiece thereon longitudinally of the chuck in one direction, a cam operated by the driving means and connected to move the workpiece mounting means longitudinally of the chuck in the opposite direction, and said cam having a contour corresponding to the contour of the surface of the workpiece to be buffed whereby the driving means rotates and moves the workpiece on the chuck as the latter is rotated to present successive surfaces of an irregular shaped workpiece at the same position for contact by the periphery of the buffing wheel.

20. A buffing machine in accordance with claim 19 in which the chuck comprises an outer casing, an inner casing mounted in and slidable along the outer casing, said workpiece mounting means being attached to the inner casing for movement therewith, said spring means acting between the inner and outer casings to move the inner casing longitudinally of the outer casing, and said cam being mounted on the movable inner casing and acting against a cam follower on the outer casing for moving the inner casing in the opposite direction.

21. A buffing machine in accordance with claim 19 in which the driving means operated by the rotation of the chuck comprises a stationary worm at the axis of the inner and outer casings, a lay shaft journaled on the inner casing to extend transversely of the axis of the worm and having a worm wheel thereon for meshing engagement with the worm, a gear driven from the lay shaft and connected to rotate the workpiece on its mounting means, and said lay shaft being connected to operate the cam to move the inner casing longitudinally of the outer casing.

22. A buffing machine in accordance with claim 19 in which the means for rotatably mounting the workpiece comprises head and tail stocks on the longitudinally movable inner casing, a fixture for mounting a workpiece, a live center on the head stock for engaging one side of the fixture, an axially movable dead center on the tail stock for engaging the opposite end of the fixture, and a spring acting on the dead center for yieldingly holding it in engagement with the fixture and movable axially against the action of the spring to release the fixture for removing the workpiece.

References Cited by the Examiner

UNITED STATES PATENTS 957,198  5/1910  Gail.
2,276,059  3/1942  Moon _____ 51—263 X ROBERT C. RIORDON, *Primary Examiner.*

L. S. SELMAN, D. G. KELLY, *Assistant Examiners.*